US012092811B2

(12) United States Patent
Szatkowski et al.

(10) Patent No.: US 12,092,811 B2
(45) Date of Patent: Sep. 17, 2024

(54) MICROMECHANICAL LIGHT DEFLECTION DEVICE

(71) Applicant: Robert Bosch GmbH, Stuttgart (DE)

(72) Inventors: Roman Szatkowski, Karlsruhe (DE); Tobias Peterseim, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1097 days.

(21) Appl. No.: 16/961,249

(22) PCT Filed: Jan. 15, 2019

(86) PCT No.: PCT/EP2019/050878
§ 371 (c)(1),
(2) Date: Sep. 17, 2020

(87) PCT Pub. No.: WO2019/141655
PCT Pub. Date: Jul. 25, 2019

(65) Prior Publication Data
US 2021/0063726 A1 Mar. 4, 2021

(30) Foreign Application Priority Data
Jan. 17, 2018 (DE) ...................... 10 2018 200 672.5

(51) Int. Cl.
*G02B 26/00* (2006.01)
*G02B 26/08* (2006.01)
(Continued)

(52) U.S. Cl.
CPC ....... *G02B 26/0833* (2013.01); *G02B 26/108* (2013.01); *G02B 1/11* (2013.01)

(58) Field of Classification Search
CPC ........ G02B 1/11; G02B 5/04; G02B 26/0833; G02B 26/108; G02B 26/105
(Continued)

(56) References Cited

U.S. PATENT DOCUMENTS

2003/0123162 A1   7/2003   Penn
2006/0152436 A1   7/2006   Kowarz
(Continued)

FOREIGN PATENT DOCUMENTS

CN        105824118 A      8/2016
DE   102017202018 A1 *    8/2018   ........... G01S 7/4817
(Continued)

OTHER PUBLICATIONS

International Search Report dated Apr. 16, 2019 in connection with International Application No. PCT/EP2019/050878.

*Primary Examiner* — Mahidere S Sahle
(74) *Attorney, Agent, or Firm* — NORTON ROSE FULBRIGHT US LLP; Gerard A. Messina

(57) ABSTRACT

A micromechanical light deflection device. The device includes a movable beam-deflecting element that is designed to deflect an input light beam into an output light beam, and a static beam-deflecting device having a plurality of differently oriented surfaces that are situated in the beam path of light for the movable beam-deflecting element in such a way that an input light beam for the movable beam-deflecting element and/or an output light beam from the movable beam-deflecting element passes through two of the differently oriented surfaces of the static beam-deflecting device.

16 Claims, 2 Drawing Sheets

(51) Int. Cl.
*G02B 26/10* (2006.01)
*G02B 1/11* (2015.01)

(58) Field of Classification Search
USPC .......... 359/196.1–226.3, 290–320, 831–837
See application file for complete search history.

(56) References Cited

U.S. PATENT DOCUMENTS

| | | | |
|---|---|---|---|
| 2009/0168028 A1* | 7/2009 | Magarill | G02B 27/126 |
| | | | 359/834 |
| 2013/0242275 A1 | 9/2013 | Kilcher et al. | |
| 2015/0131058 A1 | 5/2015 | Huang | |
| 2015/0370085 A1 | 12/2015 | Kilcher et al. | |

FOREIGN PATENT DOCUMENTS

| | | | |
|---|---|---|---|
| JP | 2008197206 A | 8/2008 | |
| JP | 2013041236 A | 2/2013 | |
| WO | 2005062627 A1 | 7/2005 | |
| WO | WO-2016093066 A1 * | 6/2016 | ............. G02B 26/08 |

* cited by examiner

MICROMECHANICAL LIGHT DEFLECTION DEVICE

FIELD

The present invention relates to a micromechanical light deflection device.

The present invention further relates to a method for deflecting light.

Although the present invention is generally applicable to micromechanical light deflection devices, the present invention is described in relation to micromechanical mirrors, or, synonymously, MEMS mirrors, in lidar systems.

Although the present invention is generally applicable to optically transparent coverings, the present invention is described in relation to optically transparent coverings in the form of cover glasses.

Although the present invention is generally applicable to electromagnetic waves, the present invention is described in relation to visible light.

BACKGROUND INFORMATION

Micromechanical light deflection devices are used in, inter alia, lidar systems. These systems typically use the light beam of a laser that is deflected or diverted in order to irradiate a particular region. If this beam meets an object in the region, then for example a distance of the object from the lidar system can be ascertained on the basis of the backscattered light, or more precisely the light runtime between the lidar system and the object. For this purpose, for example micromechanical mirror systems—MEMS mirror systems—can be used that correspondingly deflect or divert a light beam. Standardly, such a MEMS mirror device is protected and hermetically sealed by a light-transparent covering, so that a micromechanical mirror situated movably therein is protected from environmental influences. In addition, the MEMS mirror device can be operated in a partial vacuum, which increases the achievable angle of deflection for the MEMS mirror. It is conventional to configure the cover glass parallel or slightly oblique to the null position of the MEMS mirror.

U.S. Patent Application Publication No. US 2015/0370085 A1 describes a micromechanical mirror system having MEMS mirrors and a covering. Here, a piezoactuator is integrated into the covering, the actuator being connected to a transparent layer for the deformation thereof.

SUMMARY

In a specific example embodiment, the present invention provides a micromechanical light deflection device including a movable beam-deflecting element that is designed to deflect an input light beam into an output light beam, and a static beam-deflecting device having a plurality of differently oriented surfaces that is situated in the beam path of light for the movable light-deflecting element in such a way that the input light beam for the movable beam-deflecting element and/or the output light beam from the movable beam-deflecting element passes through two of the differently oriented surfaces of the static beam-deflecting device.

In a further specific example embodiment, the present invention provides a method for deflecting light in which, using a movable beam-deflecting element, an input light beam is deflected into an output light beam, and a static beam-deflecting device that is provided with a plurality of differently oriented surfaces situated in the beam path of light for the movable beam-deflecting element in such a way that an input light beam for the movable beam-deflecting element and/or an output light beam from the movable beam-deflecting element passes through two of the differently oriented surfaces of the static beam-deflecting device.

One of the advantages that may be achieved thereby is that static and non-static reflexes that arise in particular due to a cover, such as a cover glass, are avoided. "Static reflexes" here designates those reflexes that do not move together with a movement of the movable beam-deflecting element. A further advantage is that the micromechanical light deflection device is easy to manufacture and enables a large tilt angle of a cover, enabling a large field of view. In addition, it is an advantage that, during operation of the micromechanical light deflection device in a partial vacuum, beam profile changes due to deformation of the movable beam-deflecting element can be at least partly compensated. A further advantage is that multiple reflections are avoided.

A further advantage is increased eye safety during use of lidar systems, due to the nearly complete suppression of static reflexes. In addition, it can be operated at high power, so that a larger range is enabled of a lidar system based thereon. A further advantage is that dynamic reflexes are at least partly suppressed, so that ghost images are suppressed, resulting in lower error rates and increased safety. In addition, a simple and low-cost production is possible, for example using packaging technology. In addition, light can be coupled in easily, so that simple adjustment, or larger production tolerances, are possible.

Further features, advantages, and further specific embodiments of the present invention are described below, or are variations and modifications thereof.

According to an advantageous development of the present invention, the static beam-deflecting device has two optically separated regions. Using two optically separated regions, a subdivision of the static beam-deflecting device is possible, so that light paths between the regions are reliably separated, or suppressed, thus avoiding reflections.

According to a further advantageous development of the present invention, the static beam-deflecting device is designed as a cover for the movable beam-deflecting element. This enables a simple production with simultaneous reliable protection of the movable beam-deflecting element. In addition, a separate cover for the movable beam-deflecting element can be omitted, reducing production costs.

According to a further advantageous development of the present invention, the static beam-deflecting device is designed in the form of at least one prism. Using a prism, which can be made in one part or multiple parts, static and dynamic reflexes can be almost completely suppressed. Due to the wedge angle of the at least one prism, parallel beams due to multiple reflections can no longer form. In other words, a reflection back and forth of light between the plane-parallel surfaces of the at least one prism is suppressed.

According to a further advantageous development of the present invention, the static beam-deflecting device is designed in the form of a double prism, including two individual prisms, the two individual prisms being configured symmetrically to one another. Using a double prism, static reflexes can be controlled or suppressed easily and particularly reliably.

According to a further advantageous development of the present invention, the static beam-deflecting device is situated on an optically transparent cover for the movable beam-deflecting element. One of the advantages thereby achieved is that a mechanical stabilization of the optically transparent cover is enabled. For example, a curvature of an optically transparent cover in the form of a cover glass can be counteracted during operation of the movable beam-deflecting element under partial vacuum.

According to a further advantageous development of the present invention, the static beam-deflecting device is fastened on the optically transparent cover by an adhesive, the static beam-deflecting element, adhesive, and optically transparent cover having substantially the same index of refraction for at least one wavelength range. In this way, further reflections are avoided at the material transitions between the static beam-deflecting element, the adhesive, and the optically transparent cover.

According to a further advantageous development of the present invention, the optically transparent cover is made anti-reflective, in particular being provided with an anti-reflective coating. In this way, reflections are further reduced.

According to a further advantageous development of the present invention, a beamforming element for the input light beam and/or output light beam is situated in particular on the static beam-deflecting device. Using such a beamforming optical system, for example having lenses that are spherical, aspherical, or shaped as desired, an additional optical component can be avoided for a beamforming of the input and/or output light beam, enabling lower production costs.

According to a further advantageous development of the present invention, the movable beam-deflecting element is designed in the form of a micromirror. Using a micromirror, a light beam can be deflected easily and at the same time reliably.

Further features and advantages of the present invention result from the description herein and the figures.

It will be understood that the features mentioned above and explained below may be used not only in the respectively indicated combination, but also in other combinations or by themselves, without departing from the scope of the present invention.

Preferred embodiments and specific embodiments of the present invention are shown in the figures and are explained in more detail below, in which identical reference characters relate to identical or similar or functionally identical components or elements.

DETAILED DESCRIPTION OF EXAMPLE EMBODIMENTS

Figure 1:
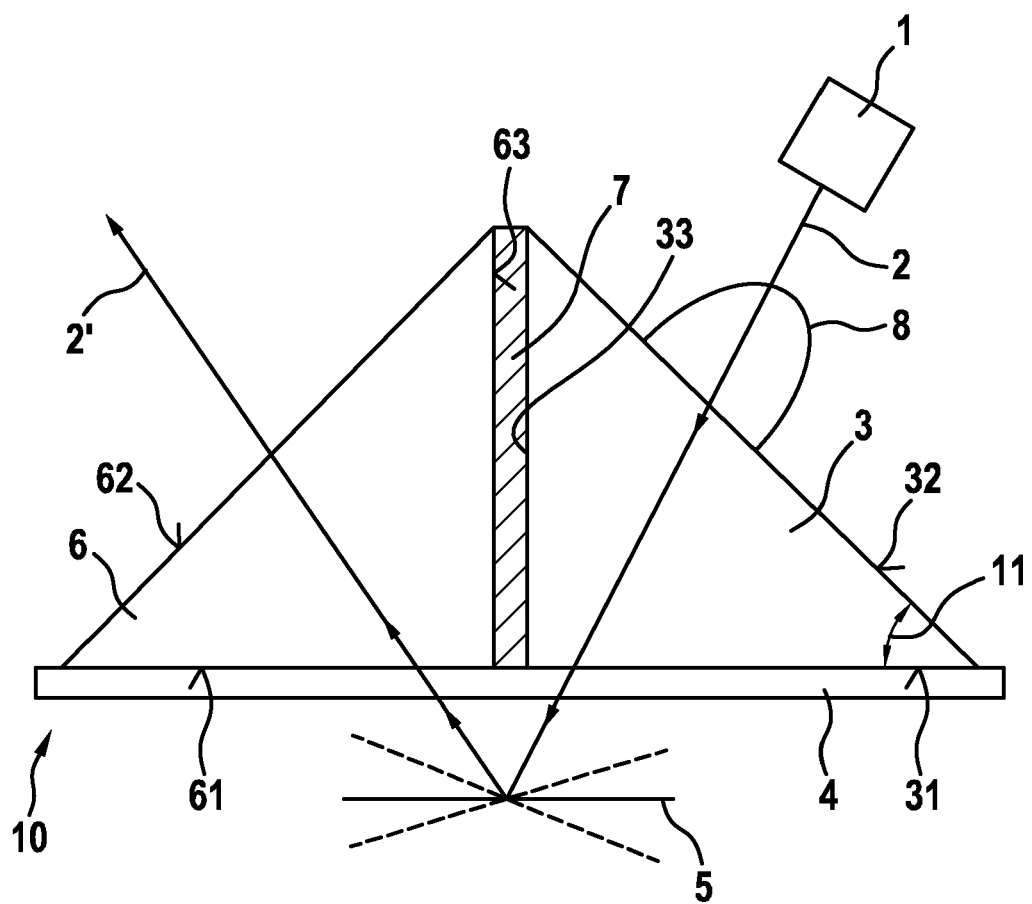
FIG. 1 shows, in schematic form, a micromechanical light deflection device according to a specific embodiment of the present invention.

FIG. 1 shows, in schematic form, a micromechanical light deflection device in cross-section according to a specific embodiment of the present invention.

FIG. 1 shows a micromechanical light deflection device 10. This device includes a micromechanical mirror 5 that is protected by a cover glass 4.

Micromechanical mirror 5, or micromirror for short, is rotatable about an axis perpendicular to the plane of the drawing, and about an axis parallel to the plane of the drawing of FIG. 1, by an angle as indicated by the dashed lines, and in this way can deflect an incident light beam 2 from a light source 1, for example from a laser, a light-emitting diode, etc. Going out from light source 1, input light beam 2 impinges on micromirror 5 via a first prism 3 and a cover glass 4. Input light be 2 is reflected by micromirror 5, is deflected by a particular angle, and enters, via cover glass 4 and a second prism 6, into an object space as output light beam 2'. Between the two prisms 3, 6, there is situated an absorption layer 7. Overall, a double prism 3, 6 is thus situated on cover 4. Light source 1 couples input light beam 2 frontally, from the front, onto micromechanical light deflection device 10, enabling a larger adjustment tolerance when coupling in input light beam 2. Prisms 3, 6 here have a wedge angle 11 of approximately 35°, which suppresses multiple reflections due to parallel beams.

Specifically, prisms 3, 6 are constructed as follows: in cross-section, the two prisms 3, 6 form right triangles having sides 31, 32, 33, 61, 62, 63. Side 32, 62 is the hypotenuse of the respective triangle, and is here inclined in each case by the wedge angle 9 of 35° relative to the plane of cover glass 4. Side 33, 63, i.e., the respective side opposite wedge angle 11, is situated parallel to the respective other prism 3, 6. Absorption layer 7 is situated between these two sides 33, 63. Sides 31, 61, i.e. the sides opposite the angles, are situated parallel to the plane of cover glass 4 on cover glass 4, in particular cemented to cover glass 4 by an optical bonding method, for example a UV adhesive, an epoxy resin, etc. Prisms 3, 6 can be produced by injection molding of plastic or blank pressing of glasses, enabling low costs with simultaneously complex constructive shapes.

Here, cover glass 4 in FIG. 1 is made flat, and is not tilted relative to the null position of micromirror 5. As already stated, the two prisms 3, 6 are situated on this cover glass 4, and are preferably glued onto the surface of cover glass 4. First prism 3, on which input light beam 2 going out from light source 1 impinges, here has a roof surface 32 that reflects as well as possible, and has side surfaces 33, 63 that are not transparent to light, or are as absorbent as possible. The two prisms 3, 6 are optically separated from one another by absorption layer 7. Cover glass 4 can be produced by rolling, enabling lower costs and a high piece count.

Cover glass 4 in FIG. 1 can also be omitted. In other words, the two prisms 3, 6 can also be attached, in particular glued, directly onto a housing of micromirror 5 without cover glass 4, taking over its function. In addition, wedge angle 11 of prisms 3, 6, and/or the material of prisms 3, 6, can be adapted in relation to the index of refraction in order to save material and/or costs and to simplify production. In general, for example, wedge angles 11 between 0° and 75°, in particular between 10° and 50°, are also possible.

In addition, as is shown in FIG. 1, a beamforming element 8, for example a spherical lens, can be situated on surface 32 of first prism 3, or can be made in one piece with first prism 3. Additional beamforming elements can then be omitted. Likewise, one or more beamforming elements 8 can be situated on second prism 6.

Figure 2:
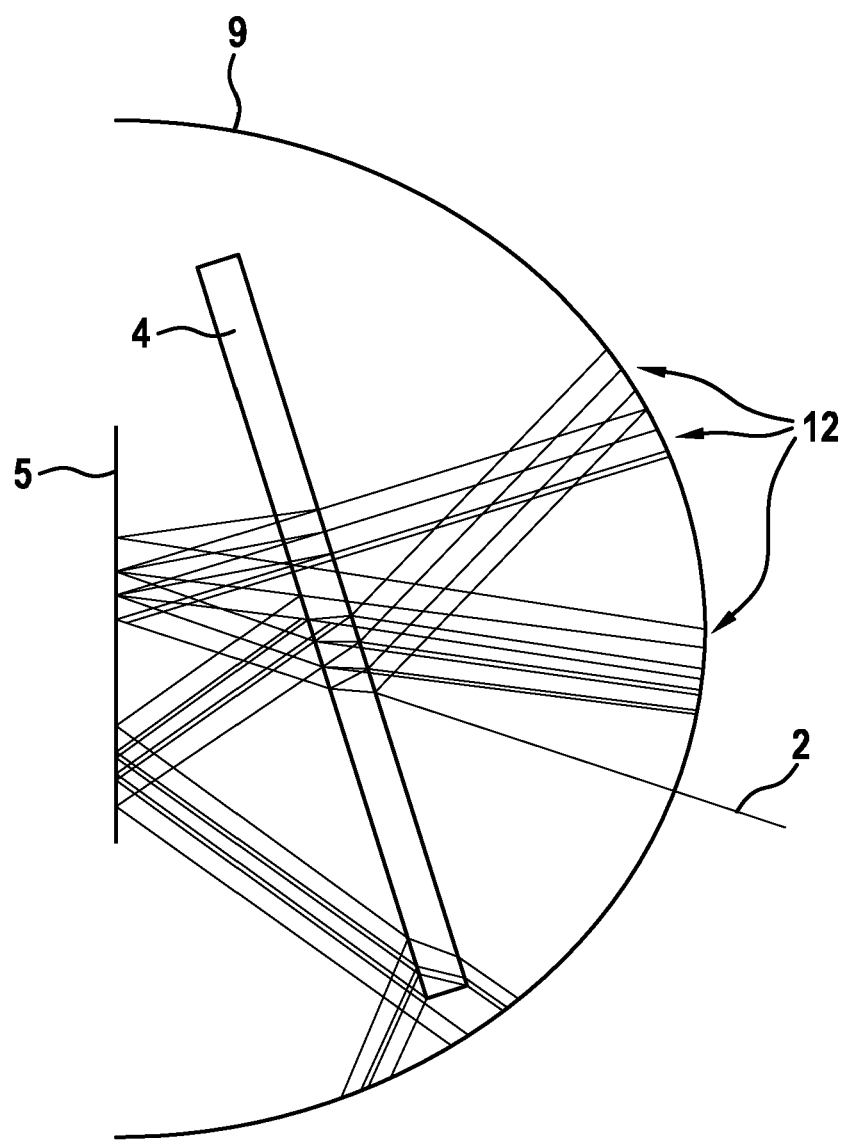
FIG. 2 shows a conventional micromechanical light deflection device.

FIG. 2 shows a conventional micromechanical deflecting device. An input light beam 2 is deflected by a micromirror 5 after passing through a cover glass 4. If an imaginary receiving surface 9, situated substantially in semicircular fashion around mirror 5, is now regarded, reflexes 12 can clearly be recognized that occur in particular due to the large tilt angle of cover glass 4 relative to the depicted null position of micromirror 5.

In sum, the present invention, in particular at least one of its specific embodiments, has the following advantages:
Suppression of static reflexes.
At least partial suppression of dynamic reflexes.
Simple, low-cost production.

Modular construction possible.

Mechanical stabilization of a cover glass, or generally of a cover, possible.

Simple coupling of light into the micromechanical light deflection device.

Simple production process for the covering and static beam-deflecting element, in particular prism.

Larger tolerances, and thus easier adjustment.

Although the present invention has been described on the basis of preferred specific embodiments, it is not limited thereto, but can be modified in many ways.

What is claimed is:

1. A micromechanical light deflection device, comprising:
    a movable beam-deflecting element configured to deflect an input light beam into an output light beam; and
    a static beam-deflecting device having a plurality of differently oriented surfaces that are situated in a beam path of light for the movable beam-deflecting element so that an input light beam for the movable beam-deflecting element and/or an output light beam from the movable beam-deflecting element, passes through two of the differently oriented surfaces of the static beam-deflecting device;
    wherein the static beam-deflecting device includes two individual prisms, and wherein each of the prisms has a wedge angle to suppress multiple reflections due to parallel beams, and
    wherein there is an absorption layer between the two prisms.

2. The micromechanical light deflection device as recited in claim 1, wherein the static beam-deflecting device has two optically separated regions.

3. The micromechanical light deflection device as recited in claim 1, wherein the static beam-deflecting device is a cover for the movable beam-deflecting element.

4. The micromechanical light deflection device as recited in claim 1, wherein the static beam-deflecting device is in the form of a double prism and wherein the two individual prisms are configured mirror-symmetrically to one another.

5. The micromechanical light deflection device as recited in claim 1, wherein the static beam-deflecting device is situated on an optically transparent cover for the movable beam-deflecting element.

6. The micromechanical light deflection device as recited in claim 5, wherein the static beam-deflecting device is fastened on the optically transparent cover by an adhesive, the static beam-deflecting element, the adhesive, and the optically transparent cover having substantially the same index of refraction for at least one wavelength range.

7. The micromechanical light deflection device as recited in claim 5, wherein the optically transparent cover is anti-reflective.

8. The micromechanical light deflection device as recited in claim 5, wherein the optically transparent cover has an anti-reflective coating.

9. The micromechanical light deflection device as recited in claim 1, wherein a beamforming element for the input light beam and/or the output light beam is situated on the static beam-deflecting device.

10. The micromechanical light deflection device as recited in claim 1, wherein the movable beam-deflecting element is a micromirror.

11. A method for deflecting light, the method comprising:
    deflecting, by a moveable beam deflecting element, an input light beam into an output light beam; and
    passing through, by the input light beam for the beam-deflecting element and/or by the output light beam from the beam deflecting element, two differently oriented surfaces of a static beam-deflecting device situated in a beam path of light for the movable beam-deflecting element;
    wherein the static beam-deflecting device includes two individual prisms, and wherein each of the prisms has a wedge angle to suppress multiple reflections due to parallel beams, and
    wherein there is an absorption layer between the two prisms.

12. The micromechanical light deflection device as recited in claim 1, wherein each of the wedge angles is approximately 35°.

13. The micromechanical light deflection device as recited in claim 1, wherein in cross-section, the two prisms form right triangles each having three sides, wherein one of the sides of each of the triangles is a hypotenuse of the respective triangle.

14. The micromechanical light deflection device as recited in claim 13, wherein each of the hypotenuses is inclined by a respective one of the wedge angles relative to a plane of a cover glass.

15. The micromechanical light deflection device as recited in claim 14, wherein for each of the triangles, a respective side opposite the wedge angle is parallel to the other prism.

16. The micromechanical light deflection device as recited in claim 15, wherein an absorption layer is between the two sides opposite the wedge angles.

\* \* \* \* \*